(No Model.)
W. MARTINIE.
PIE LIFTER AND BREAD TOASTER.
No. 583,063. Patented May 25, 1897.
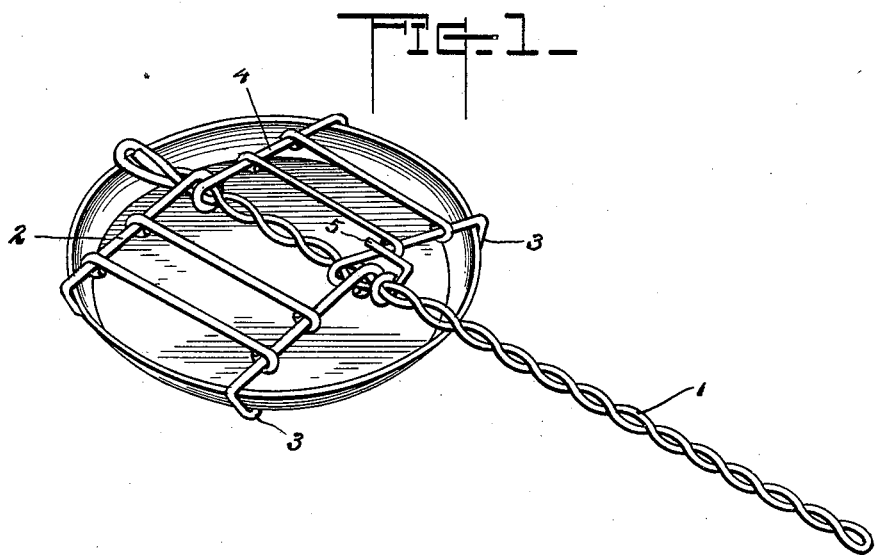
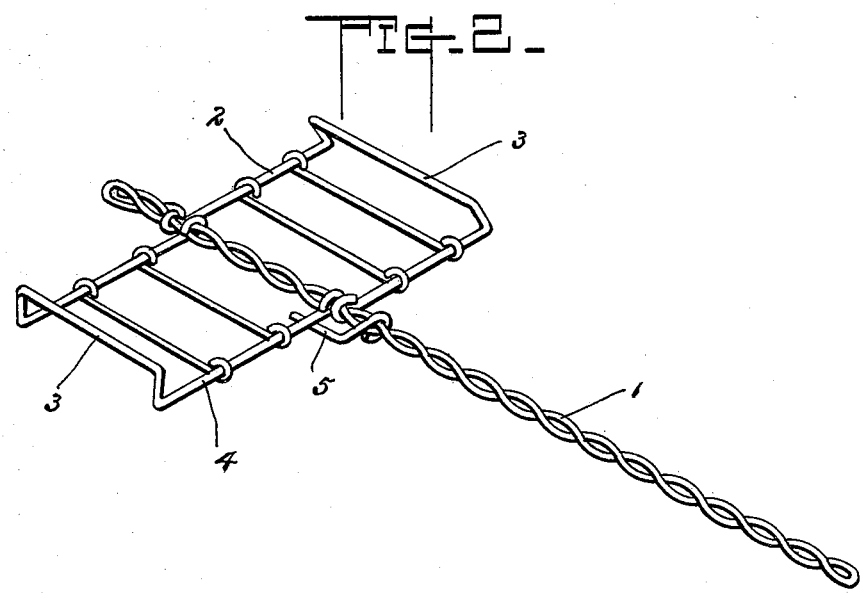
WITNESSES
INVENTOR,
Warren Martinie,
By John Wedderburn
Attorney

UNITED STATES PATENT OFFICE.

WARREN MARTINIE, OF GREENUP, ILLINOIS.

PIE-LIFTER AND BREAD-TOASTER.

SPECIFICATION forming part of Letters Patent No. 583,063, dated May 25, 1897.

Application filed October 5, 1896. Serial No. 607,844. (No model.)

*To all whom it may concern:*

Be it known that I, WARREN MARTINIE, a citizen of the United States, residing at Greenup, in the county of Cumberland and State of Illinois, have invented certain new and useful Improvements in Pie-Lifters and Bread-Toasters; and I do hereby declare the following to be a full, clear, and exact description of the invention, such as will enable others skilled in the art to which it appertains to make and use the same.

This invention has reference to a novel construction in a combined pie-plate lifter and bread-toaster; and it consists in the features of construction hereinafter described and specifically claimed.

In the accompanying drawings, illustrating this invention, Figure 1 is a perspective view showing the manner in which the invention is employed in lifting pie-plates and the like. Fig. 2 is a view of said device when used as a bread-toaster.

Referring now to said drawings, 1 indicates a handle provided at its outer end with a laterally-projecting wing 2, rigid therewith. The outer end portion of this wing is provided with an inwardly-projecting hook 3. The said wing consists of a skeleton frame, and the handle and wing are preferably made from a piece of wire suitably bent and twisted. Opposite the wing 2 is another wing 4, having a hook 3 and constructed similarly to the wing 2, but hinged to handle 1. Secured to the handle 1 is a fastening device 5, which is adapted to engage the hinged wing 4 and hold it in an extended position, as shown in Fig. 2.

This device is used in the following manner, viz: When it is desired to lift plates, the device is held in a manner to throw the hooks 3 into engagement with the rim of the plates, as shown in Fig. 1. In this way it will be seen that plates can be readily lifted and carried. As a bread-toaster the wings are extended to stand in alinement with each other and are secured by the fastener 5, which provides an extended frame upon which the bread can be placed. It is obvious that this invention is simple and can be constructed in a durable and economical manner.

Having thus described my invention, what I claim as new, and desire to secure by Letters Patent, is—

A device of the kind specified consisting of the handle having a rigid wing provided with a hook at its outer end, a hinged wing provided with a hook at its outer end, and means for holding said hinged wing in an extended position, substantially as described.

In testimony whereof I have signed this specification in the presence of two subscribing witnesses.

WARREN MARTINIE.

Witnesses:
CHAS. M. SMITH,
JOHN HOLT.